United States Patent [19]
Conn, Jr.

[11] 3,936,920
[45] Feb. 10, 1976

[54] AERODYNAMIC SHELL STRUCTURE WITH FITTINGS AND METHOD FOR FABRICATING SAME

[75] Inventor: Charles E. Conn, Jr., Santa Ana, Calif.

[73] Assignee: TRE Corporation, Beverly Hills, Calif.

[22] Filed: May 4, 1973

[21] Appl. No.: 357,359

Related U.S. Application Data
[63] Continuation-in-part of Ser. No. 280,645, Aug. 14, 1972.

[52] U.S. Cl........ 29/156.8 B; 29/156.8 H; 228/181; 228/189; 228/193; 416/232
[51] Int. Cl.²................... B23P 15/04; B23K 31/00
[58] Field of Search........... 29/498, 497.5, 156.8 R, 29/156.8 H, 156.8 B; 416/229, 232; 228/181, 189, 193, 178

[56] References Cited
UNITED STATES PATENTS

| | | | |
|---|---|---|---|
| 2,947,078 | 8/1960 | Pflumm et al. | 29/497.5 |
| 3,070,880 | 1/1963 | Davis et al. | 29/498 |
| 3,158,732 | 11/1964 | Kazakov | 29/498 |
| 3,170,234 | 2/1965 | Tarr | 29/498 |
| 3,186,083 | 6/1965 | Wright | 29/498 |
| 3,245,143 | 4/1966 | Chopinet et al. | 29/498 |
| 3,427,706 | 2/1969 | Jaffee | 29/497.5 |
| 3,628,226 | 12/1971 | Nelson | 29/156.8 H |
| 3,649,425 | 3/1972 | Alexander | 29/156.8 B |
| 3,736,638 | 6/1973 | Stone | 29/156.8 H |

FOREIGN PATENTS OR APPLICATIONS
| | | | |
|---|---|---|---|
| 567,999 | 12/1958 | Canada | 29/498 |

OTHER PUBLICATIONS
Smallen, H. et al., *Welding Journal, Corrugated–Sandwich Structure*, Apr. 1960, pp. 314–321.

*Primary Examiner*—C. W. Lanham
*Assistant Examiner*—Dan C. Crane
*Attorney, Agent, or Firm*—Blakely, Sokoloff, Taylor & Zafman

[57] ABSTRACT

The present invention is a lightweight, internally stiffened aerodynamic shell structure with local fittings and a method for fabricating the same. Two typical type structures are the blades and vanes of a turbo fan engine. The invented structure exhibits heretofore unattainable strength and stiffness to weight ratios and a high degree of structural integrity. It is, therefore, particularly advantageous in applications such as the rotating blades in airborne or ground power conversion equipment. It is an aerodynamically shaped structure comprising metallic stiffening material interposed between, and joined to, a pair of relatively thin corresponding metallic face sheets which form the shell skin of the structure. As a function of design requirements, a root fitting, shroud fitting, and tip rib or fitting are solid-state diffusion bonded to the shell structure. In addition, the leading and trailing edges of the shell structure are formed by the solid-state diffusion bonding of the edges of the corresponding face sheets. The invented method for diffusion bonding the shell structure to the required fittings and the edges of the face sheets to form the leading and trailing edges achieves a homogeneous joint having parent material strength and properties while achieving a high degree of filleting in multiple directions. The invented method for fabricating the invented aerodynamic shell structure includes the use of (i) flow volumes of excess material located on the parts to be joined, the respective geometry and location of such flow volumes being determined as a function of the geometry of the parts and the juncture to be achieved, as well as the required filleting, and (ii) a specially designed die assembly which applies high localized pressure at an elevated temperature for a suitable period of time to achieve the desired plastic flow diffusion bond. Typical metals used to construct the invented shell structure are the wrought alloys such as titanium, aluminum, stainless steel, nickel base alloys, cobalt base alloys and columbium base alloys, etc. The invention also contemplates many variations of the internal stiffening material used to achieve the required shear and bending stiffness, and the placement of such material.

43 Claims, 30 Drawing Figures

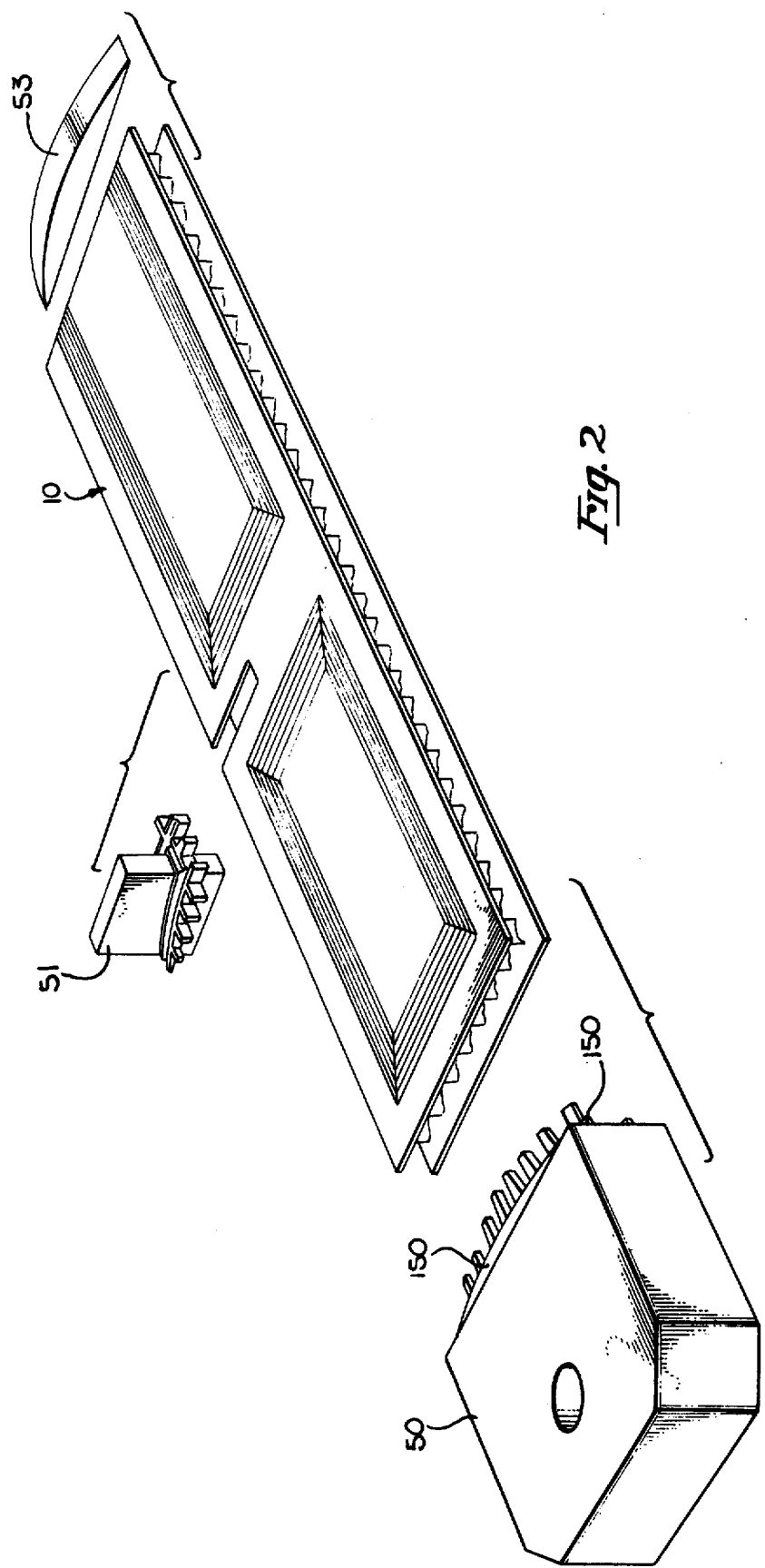

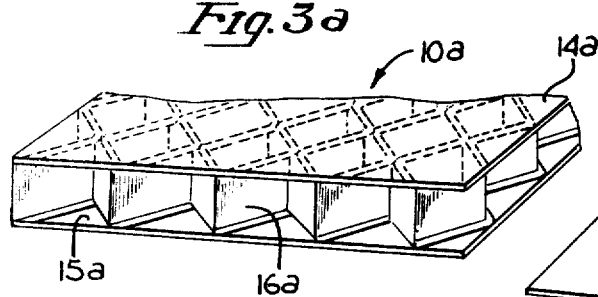
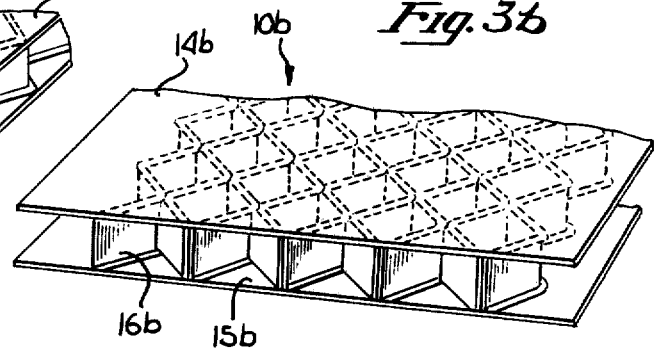
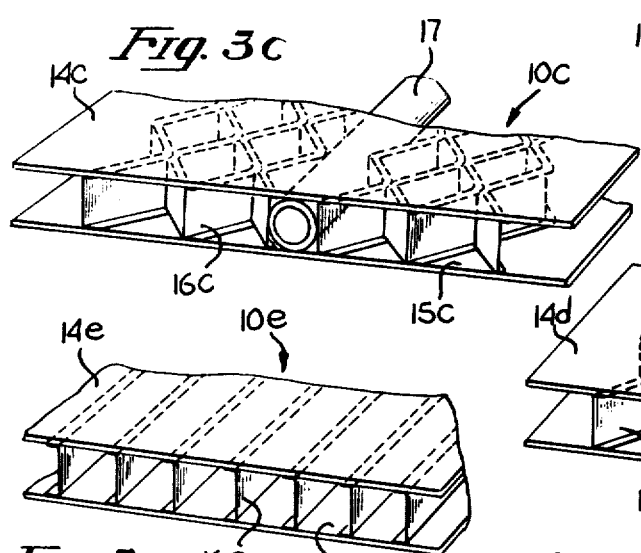
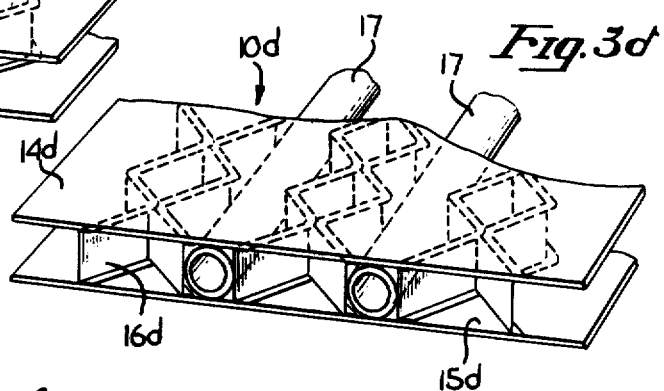
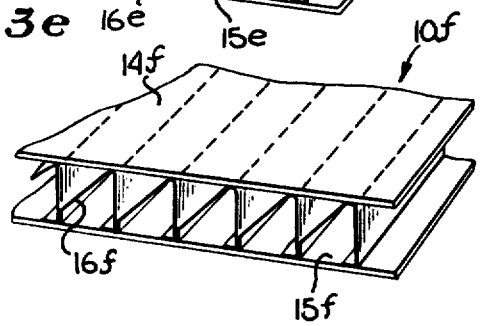
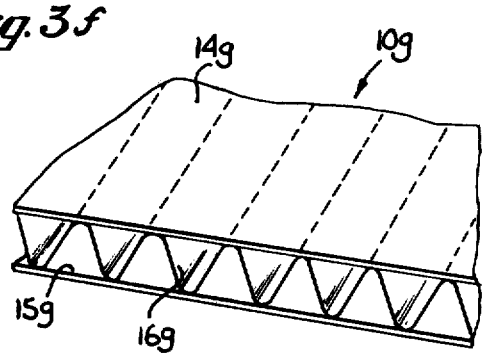
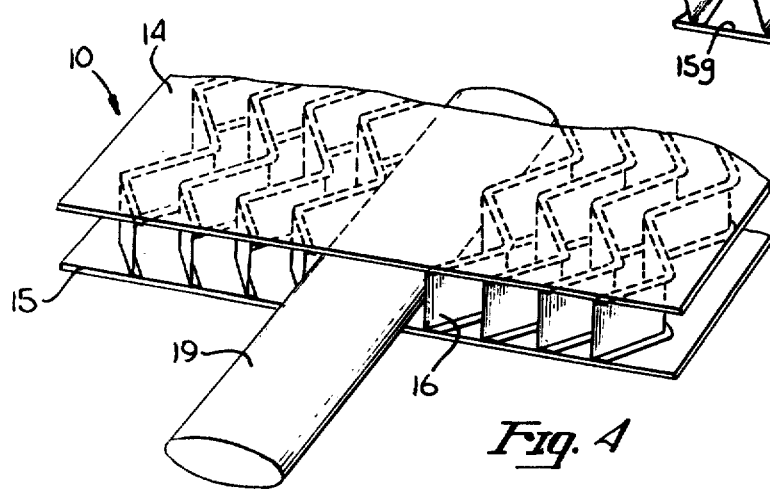

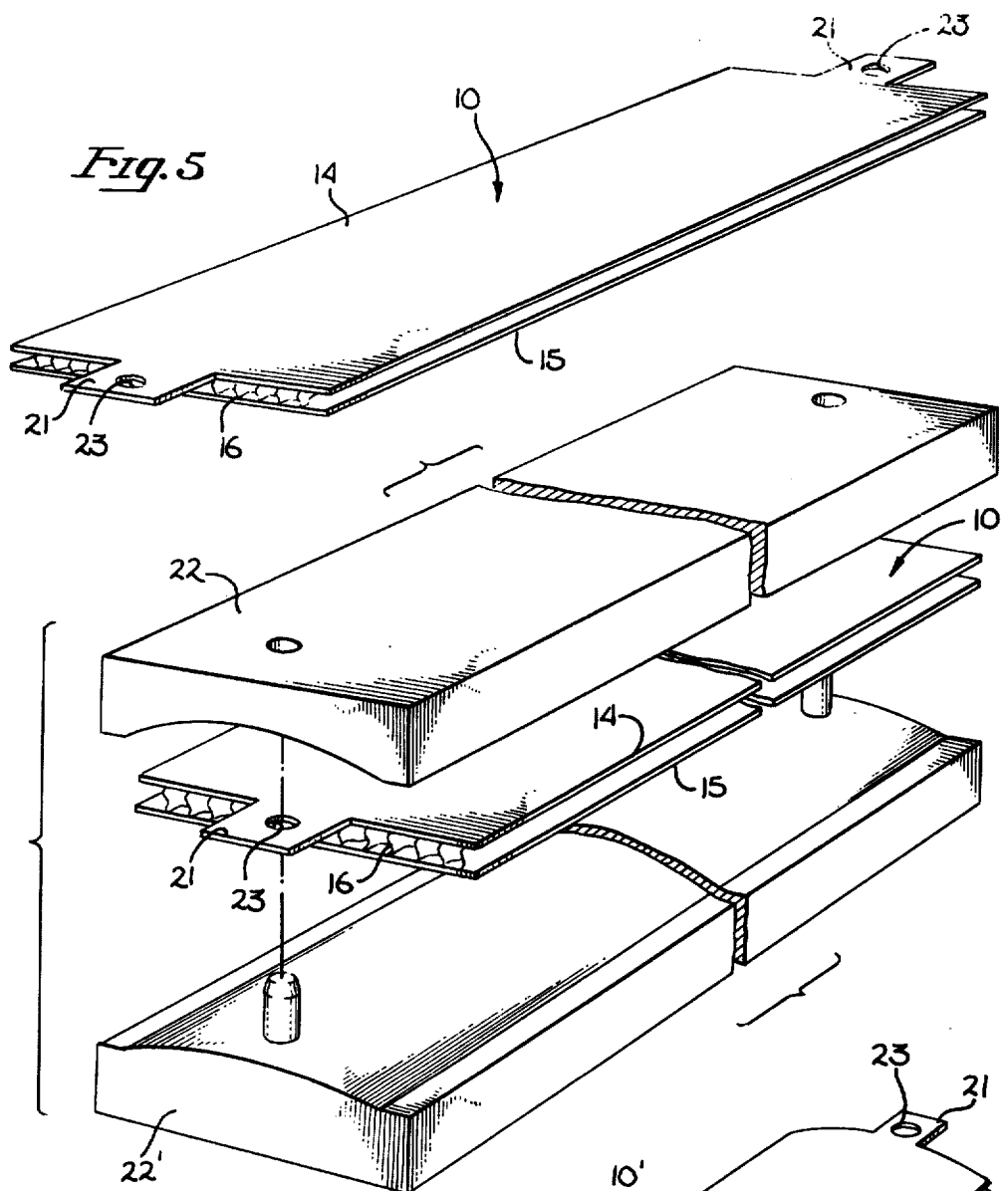
Fig. 5
Fig. 6
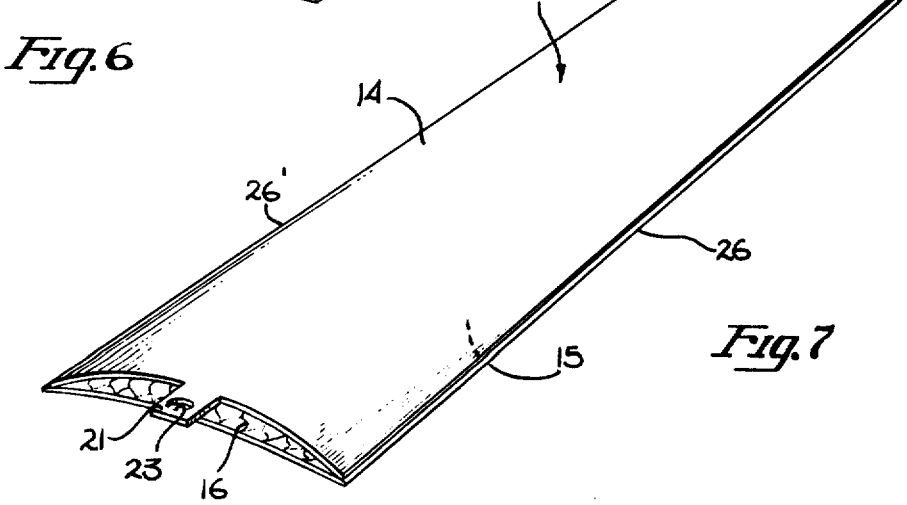
Fig. 7

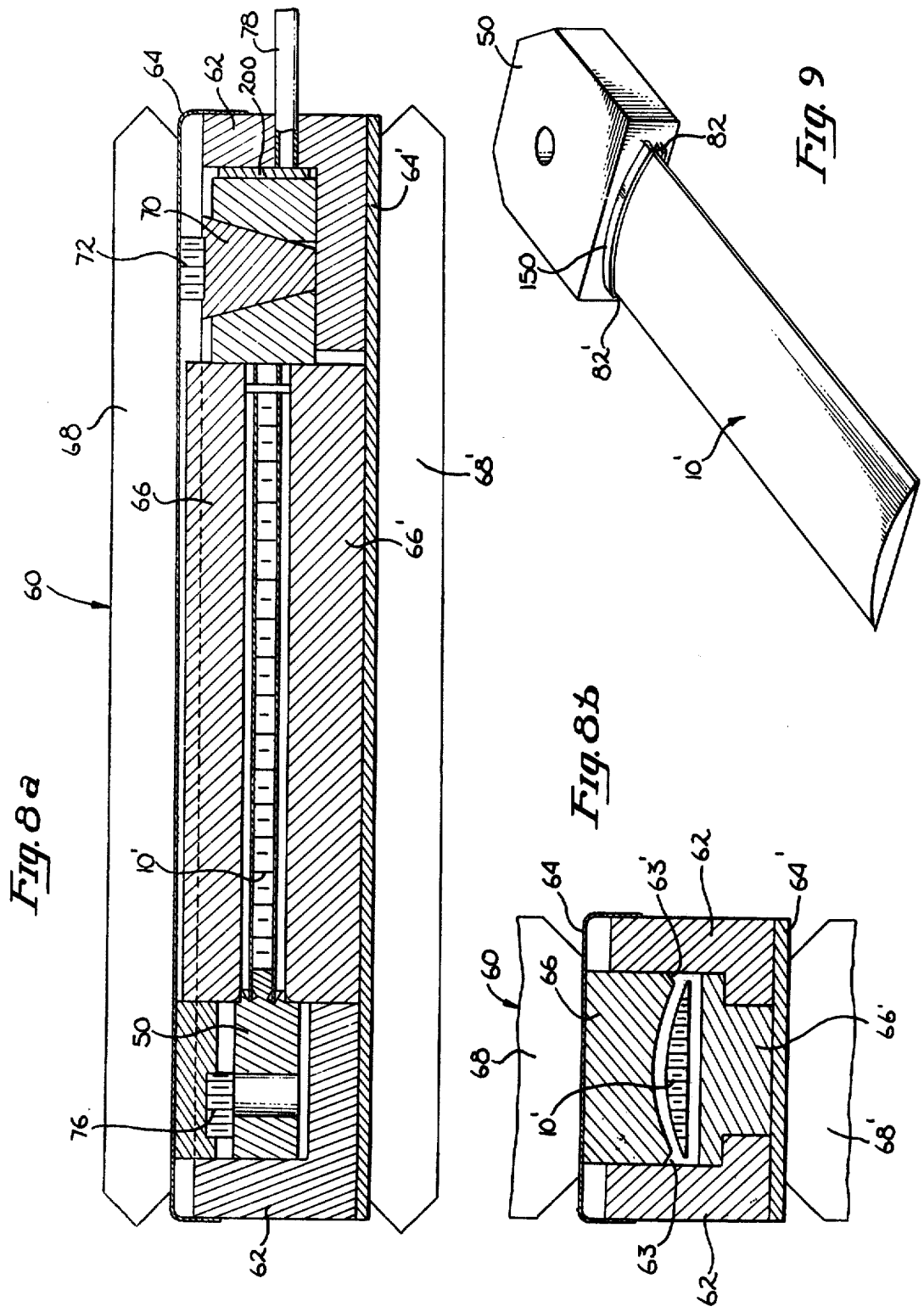

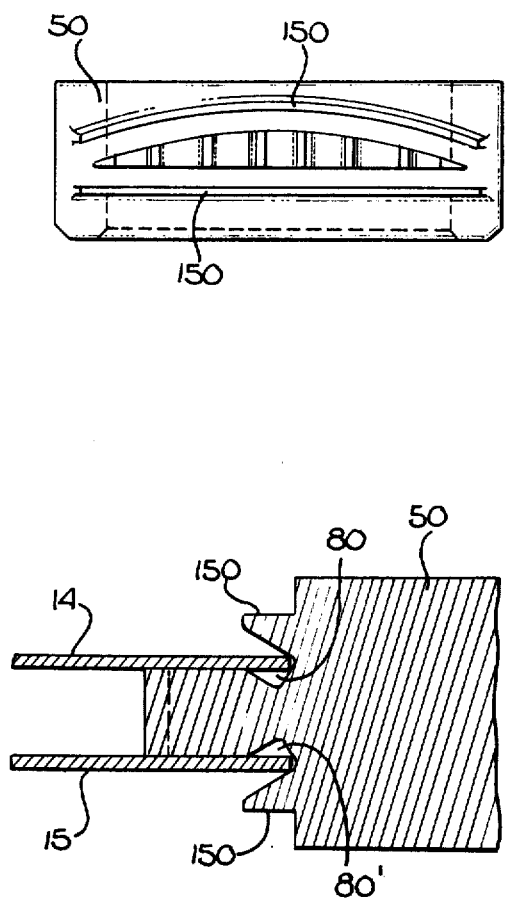
Fig. 10
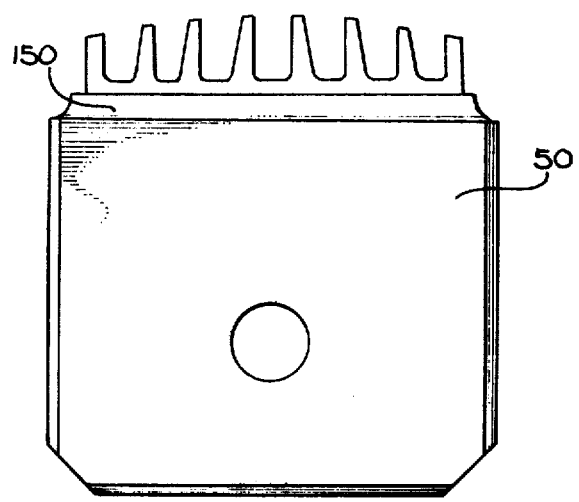
Fig. 11
Fig. 12
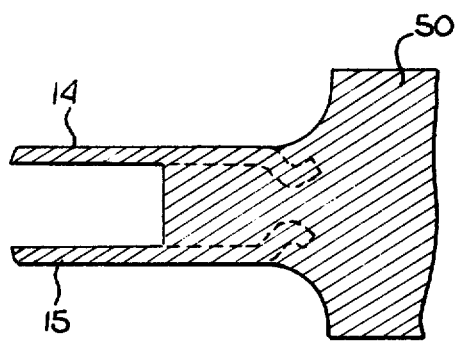
Fig. 13

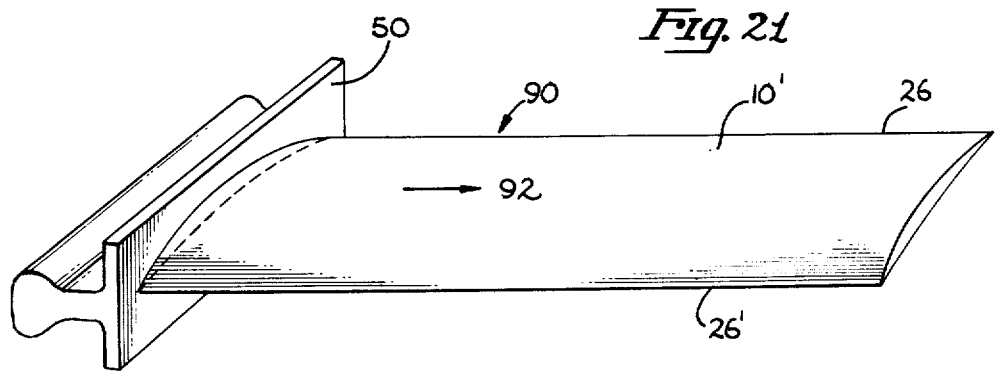
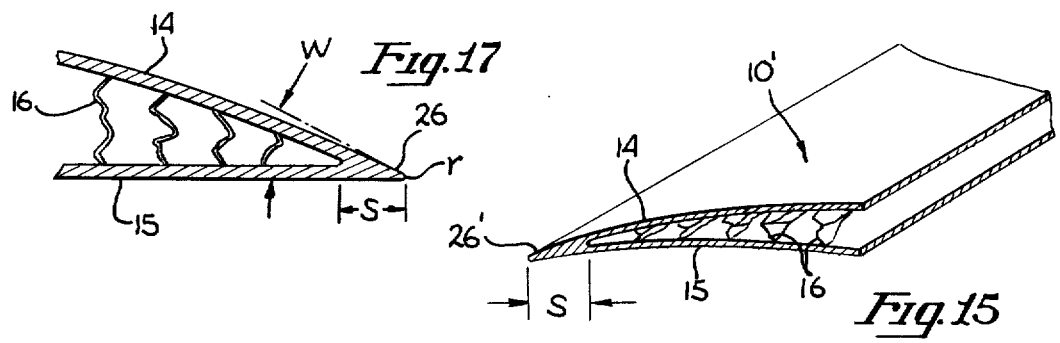
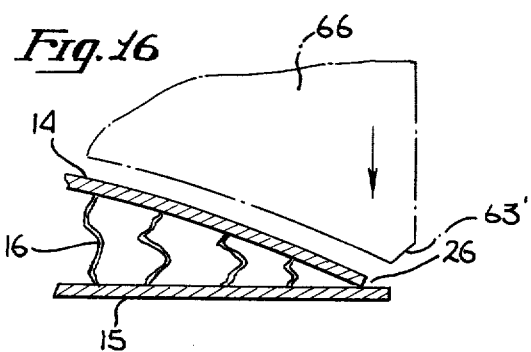
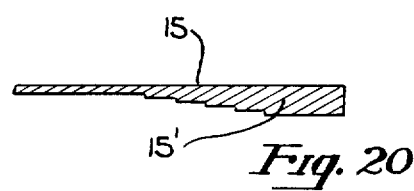
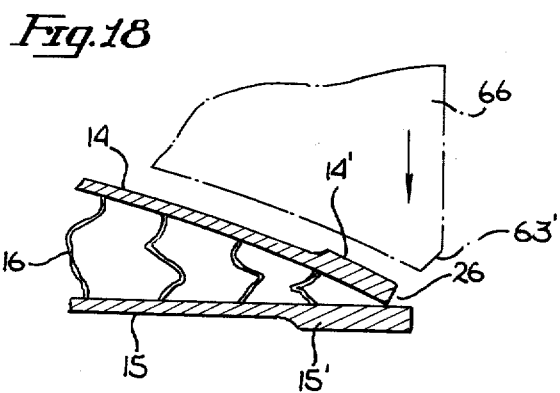
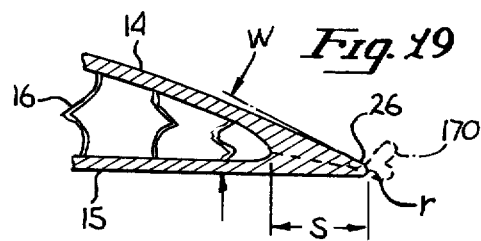

AERODYNAMIC SHELL STRUCTURE WITH FITTINGS AND METHOD FOR FABRICATING SAME

This application is a continuation-in-part of my co-pending application entitled INTERNALLY STIFFENED CONTOURED SHELL STRUCTURE AND METHOD FOR FABRICATING SAME, filed Aug. 14, 1972, and assigned Ser. No. 280,645.

BACKGROUND OF THE INVENTION

1. Field of the Invention

This invention relates generally to internally stiffened shell structures and, more particularly, shell structured aerodynamic blades and vanes and a method for fabricating the same.

2. Prior Art

Power conversion equipment which utilizes the change in velocity and direction of gas flow requires the use of rotating blades and stationary vanes. For airborne equipment it is necessary that structural concepts, yielding maximum strength and stiffness to weight ratios, be utilized to achieve the required power to weight efficiency. In all cases, it is desirable to minimize the weight of the rotating blades. Blades and vanes are thin aerodynamic shapes with varying degrees of camber, twist, and thickness as a function of the gas flow requirements. The gas pressure and flow characteristics impose bending strength and stiffness, torsional strength and stiffness, and shear strength and stiffness requirements upon the structural configuration of the blade or vane.

It is known that the lightest weight structures are achieved by utilizing a material having a high strength to weight ratio in conjunction with a structural configuration which places this material at the periphery of the structure, i.e., a hollow section. However, when using a hollow section with thin material, the material becomes unstable in compression and shear buckling modes. The use of internal stiffening material to stabilize the thin facing skins of hollow sections has been developed and proved in service for many years. While such internally stiffened shell structures are known in the prior art, they have been used in substantially planar configurations and large shells, and heretofore it has not been known how to fabricate them in the intricate shapes and geometric forms required by many applications, such as, for example, aerodynamic blades and vanes. Thus, the present invention now makes available for applications requiring contoured structures, the significant advantages of lightweight, structurally efficient, thin skin shell structures with internal stiffening material, all of whose joints have the homogeneity of the parent material. Such lightweight structurally efficient shell structures are highly advantageous when used in applications such as, for example, power conversion equipment, helicopter blades and turbo engine fan blades and vanes. In addition, the present invention achieves its high structural strength to weight ratio within the economic constraints of system cost effectiveness.

The most common method today for fabricating aerodynamic blades and vanes is by forging solid blanks, followed by 100 percent machining to achieve the desired shape and contours. While net precision forgings may also be produced, these require use of special alloys known in the art, but the latter are not as efficient as the wrought alloys. In the case of larger vanes, builtup brazed assemblies are typically produced. Each of these present methods are relatively costly and produce structures which are heavier than desirable. Recent "advances" in the art, such as the filling of hollow structures with suitable potting compounds, have enabled the production of lighter vanes. However, the vanes so produced have suffered from a disappointingly high failure rate because of the strain incompatability of dissimilar materials. A further shortcoming of blades and vanes produced by the methods of the prior art, other than solid structures, are their susceptibility to catastrophic failure caused by foreign object damages.

The present invention overcomes these shortcomings and limitations of the prior art by disclosing an internally stiffened shell structure having lighter weight, lower cost and greater structural integrity than has heretofore been attainable, and a practical method for its fabrication. The phrase "structural integrity", as used herein, relates to the strength and stiffness of the structure per pound and its resistance to catastrophic failure from foreign object damage. The resistance of the present invention to foreign object damage is attributable to the parent material homogeneity achieved by the diffusion bonded joining techniques disclosed herein. The value of this invention is best illustrated by reference to turbofan engine fan blades. As indicated above, these blades are now typically machined from solid material. Hollow, internally stiffened shell structured blades made of the same material by the present invention would have approximately one-third of the weight of solid blades made by the methods of the prior art. Weight saved on a rotating fan blade results in additional weight and economic savings in the full engine configuration by virtue of the reduction of the loads on the fan disc, main shaft, bearings, support structures and containment shrouding. The weight saving multiplier in a typical turbofan engine is in the range of 3–5. Thus, for each pound of weight saved on a fan blade, 3 to 5 pounds of weight is saved in the totally configured engine.

The use of shell structures with internal stiffening material for the manufacture of aerodynamic blades necessarily requires the geometric placement of transition material, in an optimum location, for efficient load transfer from the relatively thin shell material to the more massive root fitting. Ideally, the blade and the root fitting should be a completely homogeneous material. One approach to this ideal structure is to carve the most efficient structural configuration from a mass of homogeneous material having a high strength to weight ratio, thereby precluding any need for joining. However, except for the most simple structural components, the one-piece homogeneous structure is neither weight efficient nor economically feasible. The techniques for producing homogeneous material structural components include machining from bar or plate stock, net forging, forging plus machining and extruding (for constant section members). These production techniques are not applicable to the fabrication of thin wall and hollow sections with internal stiffening material. In addition, the cost of machining aerodynamic thin shapes with varying thickness, camber and twist from solid stock is very high.

Because of the limitations on producing one-piece homogeneous aerodynamic stiffened shell structures, techniques for joining the blade to the root fitting must be used. All typical production methods of joining metals, such as by riveting, bolting, welding, brazing, organic bonding and polyimide bonding result in a load transfer capability lower than that of the parent material utilized; i.e., they do not achieve the required homogeneous properties and strain rate of the parent material across the joint. The solid state diffusion bonding technique, on the other hand, provides (i) a means for achieving full parent material strength across the joint interface because no foreign material is utilized; and (ii) strain compatibility across the joint interface. Several diffusion bonding techniques have been developed, such as, for example, roll bonding, press bonding and vacuum bag bonding. However, each of these techniques imposes limitations on the structural configurations achievable; for example, roll, press and vacuum bag diffusion bonding techniques cannot produce the required blending or filleting. In addition, they are not applicable to complex aerodynamic shapes. Each of these known techniques of diffusion bonding and their respective limitations and shortcomings are briefly described hereinbelow.

The roll diffusion bonding technique utilizes a steel tooling retort with positioning filler tooling to locate the members to be joined in proper respective positions. The intimate contact is established by roll reducing the retort/tooling and to-be-joined parts by a sufficient percentage (generally 50 to 60 percent) to guarantee completely intimate surface contact and diffusion bonding. This process utilizes expendable tooling and is basically limited to the attachment of members in the rolling direction. The degree of joined member filleting is limited by the combination of tooling material flow and detail parts flow.

The press diffusion bonding technique utilizes reusable positioning and restraining tooling and massive hydraulic presses as the pressure source to establish the intimate contact. However, to utilize reusable tooling, the local surface deformation is generally limited to less than 5 percent. This requires the surfaces to be joined to be matched within very close tolerances. In addition, it also requires, because of the relatively low local unit pressure, a long time at an elevated temperature to allow the diffusion cycle to complete. Flow filleting is very limited because of the low local deformations allowable.

The vacuum bag bonding technique utilizes atmospheric pressure as the pressure source and is therefore limited to very thin sheet structures which can attain the required intimate surface contact at this relatively low pressure. Because of this low pressure, the time at an elevated temperature required to complete the diffusion cycle is very long. In addition, flow filleting cannot be achieved.

As a result of the above-described limitations in the techniques of joining metals, prior art turbofan engine fan blades, for example, are either completely machined from wrought bar stock or forged and completely machined, notwithstanding the high cost of such methods and the lower strength to weight ratio of the resulting blade as compared to that attainable with hollow internally stiffened shell structures. The present invention, however, overcomes these limitations of the prior art and discloses an aerodynamic blade or vane comprised of an internally stiffened shell structure which is diffusion bonded to a more massive root fitting, and a practical method for its fabrication. The invented structure may also include a shroud fitting and/or a tip rib or fitting as required. The invented techniques for diffusion bonding the shell structure to the required fittings achieves filleting and attachment in multiple directions. It also enables one to shape the member intersections so as to minimize stress concentrations. Further, the advantages of the present invention are attainable within the constraints of economic feasibility.

BRIEF SUMMARY OF THE INVENTION

The present invention is a lightweight internally stiffened shell structure of aerodynamic shape attached to more massive members for load transfer, and a method for fabricating the same. The invention will be described with reference to a typical titanium turbofan engine blade. However, it should be understood that while this description relates to titanium blades of a turbofan engine it is applicable to substantially all aerodynamic shaped structures as well as to other applications requiring structurally efficient members and is applicable to alloys other than titanium. Since the present invention comprises both the method for fabricating and the structure produced thereby, a description of the invented method will necessarily include a disclosure of the invented structure and its essential characteristics.

The main emphasis of the present invention is to present an economically feasible design concept and fabrication technique for the above structure. To achieve this objective, it is required that the detail parts to-be-joined be kept simple and to a minimum in number. The internally stiffened shell structure is achieved through design and fabrication of a panel, the concept of which includes (i) constant face sheet spacing for simplicity; (ii) face sheets having the thickness required for selective placement of plastic flow material; and (iii) the internal stiffening material being crushable to achieve the required varying shape. This use of a pre-fabricated panel blank minimizes the number of detail parts to be processed during the final joining process and eliminates the requirement for complex removable internal tooling within the contoured shape of the completed structure. In addition, the use of a pre-fabricated panel blank enables the fabrication of a completely closed internally stiffened shell structure.

The solid state diffusion bond juncture of the panel skins to the required fittings, the required filleting shape and the joinder of the upper to lower skins to form leading and trailing edges is achieved by local plastic flow of material provided on the detail parts. The die design concept provides for high, localized pressures on these juncture areas, as well as the required finished part shape. The internal stiffening members of the panel are crush formed to the aerodynamic shape. The crush formed internal stiffeners provide sufficient support for the face sheets during the diffusion bonding process; therefore, no internal stabilizing tooling is required.

The internally stiffened crushable panel blanks may be made in a variety of configurations as required to satisfy the particular design requirements and the operational environment. For example, in some applications, round tubes may be included at intervals within the thin gage internal stiffening materials for additional shear and bending stiffness. In the case of aerodynamic blades, spaces are provided in the internal stiffening material along the outer edges of the panel blades in order to permit the fabrication of leading and trailing edges having very low wedge angles.

The panel blank is then rough trimmed to size, and provisions are made for contour references control by means of index holes. Next, it is crushed in a pair of crush dies in order to achieve the basic shape required. The thin membranes of the internal stiffening material crush form to a spring-like shape, while any internal tubes crush form to elliptical shapes. In the case of blades or vanes, the outer edges of the face sheets come together on each side of the panel blank to form the beginning of what will ultimately be the leading and trailing edges.

A retort die assembly is utilized for the final forming of the blade and the solid state diffusion bonding of (i) the blade shell sheets to a root fitting (or other fittings as required) and (ii) the edges of the face sheets to form the leading and trailing edges. The die assembly is designed and fabricated following (i) a determination of the volume of material required to flow in order to achieve the desired juncture; (ii) a determination of the direction of the forming and joining force, or load application, as a function of the geometry of the parts to be joined and the desirerd homogeneous juncture shape; (iii) establishment of the die ram action required to apply the required pressure to the parts, and the die ram shape to achieve the desired part geometry; and (iv) establishment of the retort or vacuum furnace press die tooling configuration.

In general, solid state diffusion bonding requires the removal of surface films and oxides from the materials to be joined. The surfaces of the materials are then placed in intimate contact, usually under pressure, while at an elevated temperature. The higher the temperature, the greater is the molecular diffusion across the joint interface in a given interval of time. Different alloys require different temperature and time parameters. However, for each alloy the diffusion temperature is limited by the transformation temperature, i.e., the temperature at which the grain structure of the material will transform to a degraded strength configuration. The method of the present invention for solid state diffusion bonding the blade section to the root fitting, and other fittings as required, as well as the method of joining the leading and trailing edges, includes the simple selective positioning of required material in the area of the materials to be joined so that plastic flow of the material forms the required filleting, while at the same time achieving the intimate contact for the solid state diffusion bondings of the materials. In addition, by the design of the die tooling, more fully described hereinbelow, high localized pressure is applied to the detail parts only in the joint area through the use of existing pressure equipment, such as, for example, an hydraulic press.

The diffusion bonding process requires the maintenance of an inert atmosphere during the time the detail to-be-joined parts are at the elevated temperature in order to prevent their oxidation. This inert atmosphere can be achieved by maintaining a vacuum or by utilization of an inert gas. In the following description of this invention, the approach described is one which utilizes the die tooling as a vacuum retort. It should be understood, however, that alternate approaches, such as a vacuum furnace press, inert atmosphere furnace press, inert gas retort die assembly, or inert gas continuous purge, may also be used.

Following the cleaning of the retort tooling and the parts to be joined, the parts are installed in the retort die assembly. The retort die assembly is sealed by welding retort membrance covers over the top and bottom of the die body. A purge tube is also welded into position. The retort die assembly is then purged with an inert gas, evacuated, heated to about 1000°F to remove any remaining contaminants by vacuum hot out-gassing, and evacuated to at least a vacuum of $10^{-4}$ Torr. The assembly is then heated to a temperature approximately 50°–100°F below the transformation temperature of the alloy from which the parts are made. After a uniform temperature distribution is attained, the retort die assembly is placed in an insulation box which is adapted to be installed in an item of pressure equipment such as a hydraulic press. Appropriate pressure is applied to the heated retort die assembly for a suitable period of time to form the blade and to obtain solid-state diffusion bonding by plastic flow and creep deformation. After cooling, the upper membrane cover is cut and the blade, with root fitting attached, is removed.

Thus, a principal object of the present invention is to provide a lightweight structurally efficient aerodynamic shaped, internally stiffened shell structure attached to a more massive member or members as required for load transfer or other purposes, such structure being the equivalent of a homogeneous structure. Typical examples of such structures are turbo-fan engine rotating blades and starter vanes.

Another principal object of this invention is to provide a cost effective method for fabricating the aforesaid structure.

Yet another principal objective of the present invention is to provide an economically feasible method for solid state diffusion bonding of metal members by local plastic flow in the joint area, with the ability to achieve filleting and attachment in multi-directions and parent material properties in the joint areas and, thereby, to provide maximum fatigue life for the structure with no loss in joint strength due to in-service exposure to elevated temperatures.

The novel features which are characteristic of the present invention, as well as other objects and advantages thereof, will be better understood from the following detailed description, reference being had to the accompanying drawings in which a presently preferred embodiment and method of the invention are illustrated by example.

BRIEF DESCRIPTION OF THE DRAWINGS

FIG. 2 is a front perspective view of the simple detail parts of a typical aerodynamic blade or vane comprising an internally stiffened shell structured panel blank, a root fitting, a shroud fitting and a tip rib or fitting.

FIGS. 3a–3g are perspective views of sections of a number of typical panel blanks, each having a different internal stiffening configuration.

FIG. 4 is a perspective view of a section of a panel blank having a spacer temporarily interposed within the inner core, the subsequent removal of which leaves desired spaces within the core.

FIG. 5 is a perspective view of a panel blank which has been rough trimmed to size and provided with tabs and index holes for contour reference control.

FIG. 6 is a perspective view of a panel blank interposed between matching crush dies prior to crush forming.

FIG. 7 is a perspective view of the panel blank of FIG. 5 after being crush formed in the crush dies.

FIG. 8a is a longitudinal cross-sectional view of a retort die assembly, with parts installed.

FIG. 8b is a latitudinal cross-sectional view of the retort die assembly, with parts installed.

FIG. 9 is a front perspective view of a shell blade section tack-welded to a root fitting blank for positioning prior to the final forming and diffusion bonding step.

FIG. 10 is a front elevational view of a root fitting blank.

FIG. 11 is a top elevational view of the root fitting blank of FIG. 10.

FIG. 12 is a partial cross-sectional view of the juncture between a shell blade section and the root fitting blank of FIGS. 10 and 11 prior to plastic flow.

FIG. 13 is a partial cross-sectional view of the juncture between a shell blade section and the root fitting blank of FIGS. 10 and 11 showing plastic flow of fillet material and face sheets.

FIG. 15 is a partial front perspective view of a shell blade section showing its leading or trailing edge juncture of upper and lower face sheets.

FIGS. 16–19 are partial cross-sectional views of a shell blade section showing the manner in which the leading or trailing edge thereof is formed into a homogeneous bonded juncture.

FIG. 20 is a partial cross-sectional view of a chem-milled face sheet showing "steps" which provide extra material to plastic flow for achieving edges of greater solidity depth.

FIG. 21 is a front perspective view of a finished shell blade with attached root fitting and the leading and trailing edge junctures in the die parting plane, prior to being creep twisted to the required angle.

DETAILED DESCRIPTION OF THE INVENTION

Figure 1A:
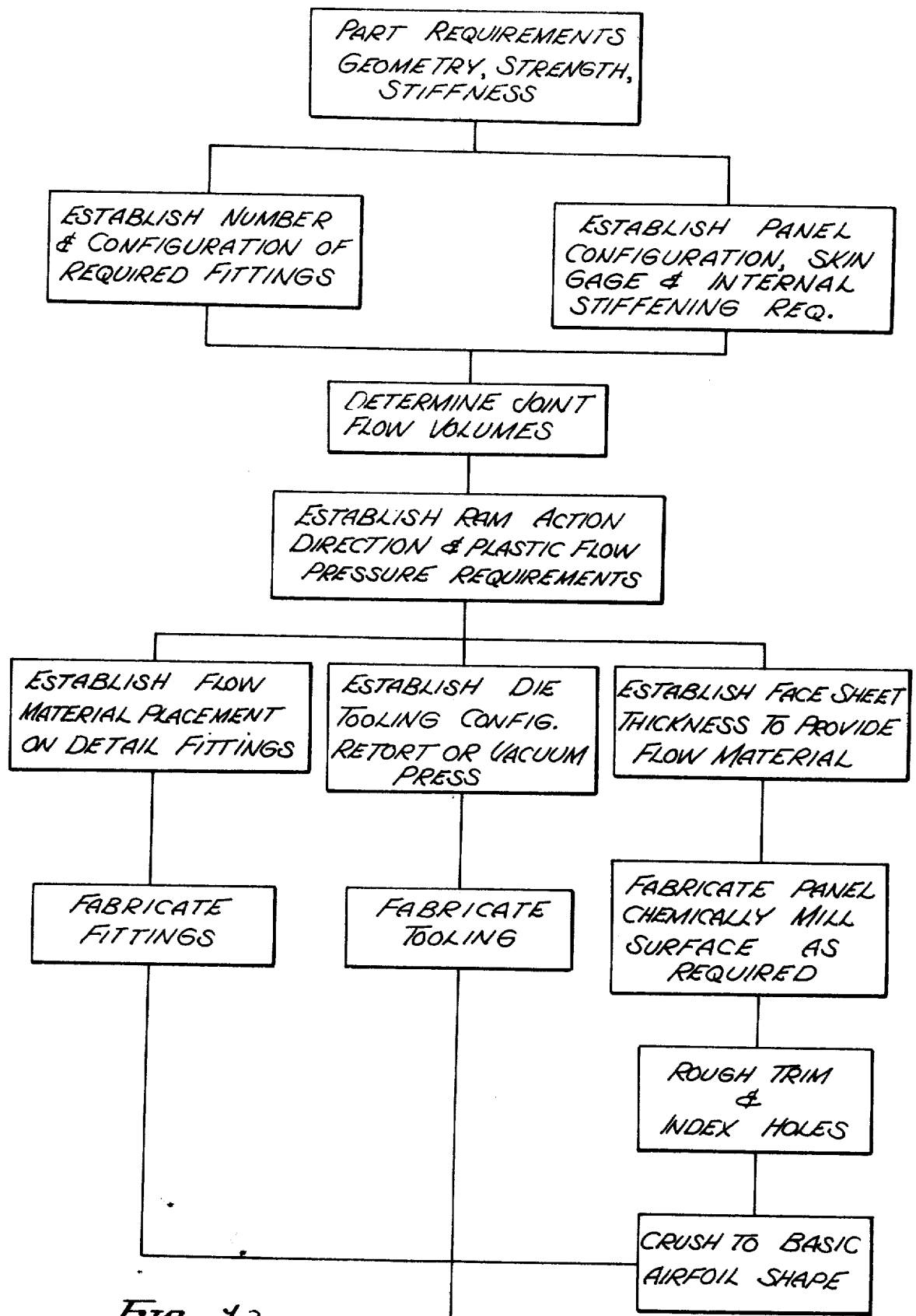
FIGS. 1a and 1b represent a functional block diagram showing the basic steps of the invented method as applied to fabricating an aerodynamic blade or vane.
Figure 1B:
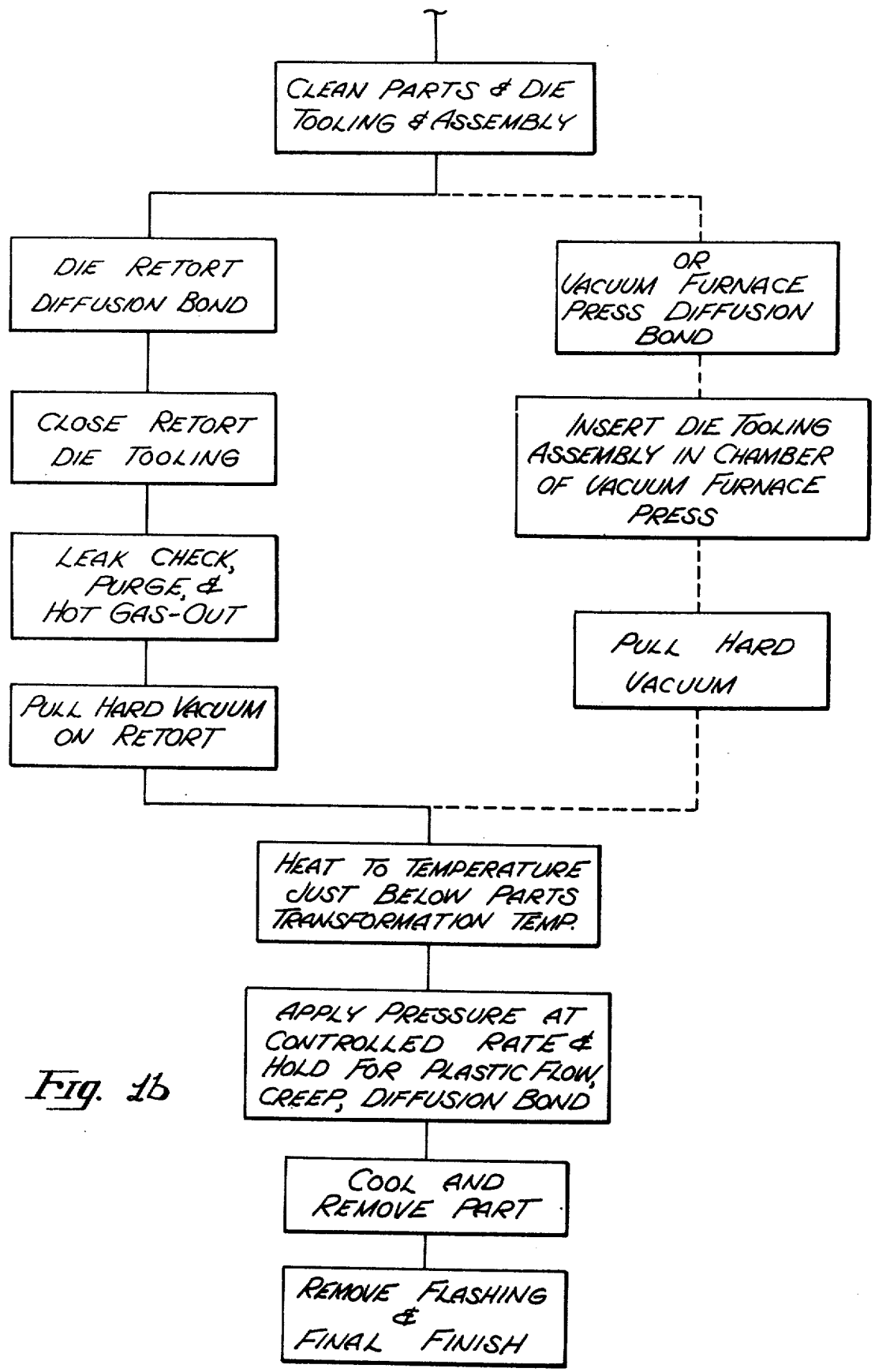

The present invention is now described in detail with respect to the fabrication of a preferred embodiment thereof, namely an aerodynamic blade. In all FIGURES like numerals are used to designate like elements. For a better understanding of the following description, reference should be made to FIGS. 1a and 1b which functionally depict the flow of the steps comprising a preferred method of the present invention. FIG. 2 shows the basic parts of the aerodynamic blade which is the subject of this description; namely, panel blank 10, root fitting 50, shroud fitting 51 and rib tip or fitting 53.

The first step of the invented method is to evaluate the finished structure requirements with respect to concentrated load application points, strength and stiffness. From this evaluation, the minimum number of fittings, shell skin thickness and internal stiffening requirements are established; in addition the transition filleting from the shell skin thickness to the fittings is determined so as to reduce the stress concentration from load transfer during functional operation.

With knowledge of the required filleting or blending geometry required at each juncture, the joint flow volumes are then determined; that is the volume of material required to supplement the intersection of straight line element parts. This volume of material, increased by approximately 5 to 10 percent to provide positive fill without unnecessarily close tolerances, is then located on the to-be-joined parts in the juncture area. It can be located on either part or divided between the two parts as a function of part simplicity. The placement of this flow material in a simplified manner on the detail parts reduces (i) the parts complexity and (ii) the requirement for zero tolerance fit up of parts and the fit up of the parts in the die, such fit ups usually being required to achieve the diffusion bond. The volume of flow material is ultimately plastic flowed by the die action to achieve the intimate contact required for diffusion bonding. The die is designed such that the surplus material flows to the edge of the finished part and is trimmed off like flashing.

Having established the flow material volumes and the direction of their flow, the ram action direction is next determined. Since economic feasibility is one of the main objectives of this invention, the die set is designed such that only a single direction of external force is required. Internal force components caused by plastic flow in the joint areas are balanced by die body restraint of the single action ram. Thus, on a part such as a fan blade, with its high twist angle, the die set is designed to accomplish the diffusion bond on an untwisted blade to maintain the single direction ram action force. The blade is later creep twisted to the required twist angle.

The ram action force is determined from the flow volumes and distance of flow for the various required joints. This force and the duration of its application are determined from the plastic flow and creep characteristics of the materials to be joined at the diffusion bonding temperature. In addition to the local joint lines of force required, the additional small force required to (i) achieve the final size of the crushed panel (which is oversized at the time it is placed in the die set) and (ii) any other slight contour forming of parts is determined.

The details of placement of the flow material on a fitting are a function of the fitting and the junction to be achieved. Typically, the volume of flow material is positioned such that it can be fabricated with simple machine cuts. The flow material 150 on root fitting 50 is shown in FIGS. 10–12. FIG. 12 also illustrates the positioning of the shell material face sheets 14 and 15 relative to root fitting 50. The shape of slots 80 and 80' of root fitting 50 and positioning of the flow material 150 causes the ends of face sheets 14 and 15 to provide a mechanical interlock after the materials are plastic flow diffusion bonded, thereby enhancing the strength of the solid state diffusion bonded joint. This mechanical interlock is shown in FIG. 13. The root platform and attachment lug are not shown in the drawings. These features are typically machined from the excess material blank of root fitting 50, as a function of the particular requirements.

One of the major features of this invention is the utilization of a simple flat panel blank 10, consisting of upper and lower face sheets 14 and 15 joined to a crushable internal stiffening material 16, to form the complex aerodynamic shaped shell structure. Various forms of the basic panel blank 10 are illustrated in FIGS. 3a–3g. The skin gage of panel blank 10 is that thickness which is required to provide a sufficient volume of flow material for diffusion bonding of the leading and trailing edges and the various other fittings.

This utilization of a prefabricated panel blank 10 minimizes the number of detail parts to be handled during the blade assembly diffusion bond cycle, thus providing economic feasibility to the invented method. The panel blank 10 itself must be fabricated utilizing a joining process which will ensure that the blank 10 will not deteriorate when subjected to the diffusion bond temperature of this invention. Preferably, panel blanks 10 should be diffusion bonded.

Panel blanks 10 are known in the art, and are typically in the form of face sheets 14 and 15 diffusion bonded to honeycomb core 16, such as those shown in FIGS. 3a–3d. In addition, processes are being developed to fabricate panel blanks 10 comprised of face sheets 14 and 15 stabilized by channels 16e, truss shaped members 16f and corrugated formed material 16g, as illustrated in FIGS. 3e–3g. Many variations of these basic panel blank configurations can be made to satisfy the specific requirements of the structure to be fabricated by the invented process.

The accomplishment of a complete homogeneous diffusion bond joint between metallic requires cleanliness, intimate contact, and exposure to elevated temperature for a period of time long enough to allow the intersurface diffusion to be completed. In general the intimate contact is established by pressure; further, the higher the pressure and temperature utilized, the shorter the diffusion time required. The invented process utilizes all of the ingredients of solid state diffusion bonding, including cleanliness, intimate contact, pressure, temperature, and time, thus simplifying the requirements with respect to the fabrication of the panel blank 10. For example, panel blank 10 can be fabricated by joining the internal stiffening material 16 to the face sheets 14 and 15 with only a partial or incomplete diffusion bond. The diffusion bonding of the panel blank 10 is subsequently completed by virtue of the cleanliness, pressure, temperature, and time parameters to which it is subjected during the diffusion bond joining processes disclosed by this invention. This represents a simplification in the fabrication of panel blank 10 and a corresponding reduction in its cost.

The selection of a particular configuration of panel blank 10 is a function of the load and dynamic environmental requirements of the application. FIGS. 3a–3g illustrate several versions of panel face sheets 14 and 15 stabilized by crushable internal stiffening material 16. In applications requiring high local load support, portions of internal stiffening material 16 may be changed to a tube 17, as shown in FIGS. 3c and 3d. Tubes 17 will crush elliptical while still maintaining their strength, thereby fulfilling the requirement of a crushable panel blank 10.

Panel blanks 10b–10d in FIGS. 3b–3d, respectively, illustrate an important feature of panel blank used by this invention. It should be noted that they have no internal stiffening material 16 between the longitudinal edges of face sheets 14 and 15. This enables the subsequent forming of leading and trailing edges 26 and 26', respectively, as more fully described hereinbelow. The exclusion of stiffening material 16 between the edges of face sheets 14 and 15 is achieved by the temporary inclusion of appropriately sized spacers, such as spacer 19, shown in FIG. 4, at required intervals along the transverse direction of panel blank 10. Spacers 19 are mechanically removed after installation of the stiffening material 16 is completed, after which the panel blanks 10 are trimmed through this open space area to their required sizes. The spaces left by spacers 19 enable the achievement of the open edges of panel blank 10, Spacers 19 having the dimensions and shape required may also be used to create air or fluid passages within internal stiffening material 16 which may be advantageous in certain applications.

The leading and trailing edge flow volumes are the volumes required to create the degree of solidity S, specified in the leading and trailing edge junctures 26 and 26', respectively formed by the edges of upper and lower face sheets 14 and 15, as shown in FIGS. 15, 17 and 19. Thus, the next step is to determine the leading and trailing edge flow volumes. To maintain the simple configuration of panel blank 10, face sheets 14 and 15 are made with the thickness required to provide the flow volume material previously determined as necessary. The balance of each face sheet 14 and 15 in the direction away from the edges thereof are then reduced in thickness to whatever is structurally required. The reduction of the thickness of face sheets 14 and 15 to satisfy overall thickness requirements can readily be accomplished by existing techniques, such as chemical milling, electrical discharge milling or machining, either in a single step or in multiple steps as a function of required area variation. FIGS. 16 and 17 show the leading joint 26 when the minimum flow material required to achieve acceptable solidity S is the same thickness as the balance of the face sheets 14 and 15. Added solidity S is achievable by adding flow volume to the edges of face sheets 14 and 15, as shown in FIGS. 18, and 19. Added flow volumes may be achieved with stepped face sheet thickness, as indicated above and as shown in FIGS. 2 and 20, providing a more gradual variation of thickness over the area of the face sheets 14 and 15.

The next panel blank operation is to rough trim the panel blank 10 to size and to provide tabs 21 having index holes 23 for contour reference control, as illustrated in FIG. 5. The tabs 21 are cut down to sufficiently small areas so as not to cause problems during final forming and shaping operations. As indicated above, panel blank 10 utilized for the embodiment described herein has no internal stiffening material along the longitudinal edges of face sheets 14 and 15; this enables the prediffusion bonding cleaning of the material which will form leading and trailing edges 26 and 26', respectively. Stiffening material 16 may also be mechanically removed from the transverse ends of panel blank 10 by conventional machining techniques so as to enable manifolding, insertion of fittings, or to satisfy other design requirements.

Next, the panel blank 10 is placed between crush dies 22 and 22', as shown in FIG. 6. Crush dies 22 and 22' are fabricated to achieve an underdeveloped vane or blade shape; an underdeveloped shape is one in which the final contour (thickness, camber and twist) of the vane or blade is not achieved, but where the crushed blank is sufficiently oversized to permit final net sizing in the diffusion bond die set. For simplicity of the crush die set 22 and 21', the twist is removed, and the leading and trailing edges 26 and 26', respectively, are approximately planar. The blade is creep twisted to the required shape in an operation subsequent to the die diffusion bonding. It is not required, however, that the lines of the leading and trailing edges 26 and 26' of the crushed panel blank 10 be in the same plane. With reference to FIG. 7, it can be seen that the crushed panel lines of leading edge 26 and trailing edge 26' are each in one plane. Maintaining the trim lines of leading and trailing edges 26 and 26' in their respective planes is important with respect to die simplicity and, therefore, maximum economic feasibility. Crush dies 22 and 22' have a controlled cavity configuration which achieves a slightly oversized thickness dimension. This ensures positive die fill during a subsequent, final diffusion bonding forming operation.

Crushing of the panel blank 10 between crush dies 22 and 22' can take place at either room temperature or an elevated temperature depending upon the properties of the internal stiffening materials 16 used and the degree of forming required. For example, the preferred temperature for crush forming alloys of titanium is in the range from 900°–1200°F because of the tendency of such alloys to crack at lower temperatures under severe forming.

The result of the crushing operation is shown in FIG. 7. It can be seen that the basic or initial aerodynamic shape of the blade has been imparted to the panel blank 10 (hereinafter to be referred to as the "shell blade section 10'.") The walls of the internal stiffening material 16 crush form to a spring-like shape while the tube 17 (when used) is crush formed to an elliptical shape.

In the next step the shell blade section 10' is formed to net contour, the leading and trailing edges 26 and 26' are plastic flow solid state diffusion bonded, and the required fittings (such as the root fitting 50) are plastic flow solid state diffusion bonded to the shell blade section 10' with the required filleting. At the same time the diffusion bond of the face sheets 14 and 15 to the internal stiffening material 16 and tubes 17, if any, is completed if the approach of incomplete diffusion bond of the panel material is utilized. For this purpose a die assembly 60 is designed which either forms a retort or is enclosed in a metallic membrane retort envelope for use in an air furnace. When an inert atmosphere or vacuum furnace press is utilized, the die assembly 60 is not sealed. In the following description, the die retort approach will be presented, since it represents the inclusion of the retort requirements. In addition, the approach of utilizing vacuum instead of an inert gas will be described, although use of inert gas is not precluded by this invention.

FIGS. 8a and 8b show a typical multi-purpose die assembly 60 which utilizes the die body 62 as the restraint tooling as well as the basic retort with upper membrane cover 64 and lower cover 64', respectively, to complete the retort. In die assembly 60 die rams 66 and ram base 66' are disposed within the die body 62 above and below the shell blade section 10', respectively. Upper and lower load distribution plates 68 and 68', which also serve as heat sink masses for more uniform temperature control of the parts, are also located atop and beneath the die body 62, respectively. Wedge 70 and wedge closure spring 72 provide a positive means for positioning the shell blade section 10' between the die body 62 and die ram and base 66 and 66', as well as maintaining root fitting 50 in a proper position relative to the shell blade section 10' to which it is to be bonded.

The wedge design performs two critical functions: first, through its vertical travel, which is imposed by wedge spring 72, the elements comprising blade section 10', typically made of titanium, the die body 62 and the rams 66 and 66' are maintained in their proper positions even though they expand at different rates during heat up due to their having a different coefficient of expansion; secondly, reverse differential thermal expansion occurs during the cool down following the plastic flow which has fully filled the diffusion bond region die cavities. The reverse wedge action is utilized to remove the die ram 66 and the shell blade section 10'. The spring 72 has a spring force sufficient to drive the wedge 70 to its closed position before movement of die ram 66 is initiated. As the ram pressure is applied, the spring 72 collapses to permit full ram travel. The die ram 66 is designed to close flush with the upper surface of die body 62 to achieve the net part section. The load plate 68 contacts the die body 62 to form a positive stop for the ram when the net required section is formed.

A similar spring 76 is utilized in a like manner to maintain the root fitting 50 (and other fittings) in its positive position until and during the application of force to the die ram 66. If springs 72 and 76 were not utilized, slight shifts in part and ram positioning due to component forces would occur during the plastic flow of material, and the proper part geometry would not be achieved.

With proper maintenance of the various detail parts, no contour machining of the finished part is required. The only machining required following diffusion bonding is to remove flashing 170, as illustrated in FIG. 19. The mating surfaces of the die assembly 60, utilized for the local plastic flow of the juncture material, are shaped in a manner to permit over-fill material to flow to the periphery of the finished part in the form of flashing 170. This flow cavity, illustrated in FIG. 8b, is formed by virtue of edges 63 and 63' of die ram 66, when the latter is in the closed die position relative to ram base 66.

Die assembly 60 is configured so that ram 66 applies a pressure on the to-be-joined surfaces which is approximately 100 times the pressure on the surfaces which are merely being formed to the required contours. For example, when titanium 6AL-4V is used, the pressure at the joints is typically about 20,000 psi while at the formed surfaces only 200–300 psi.

Completing die assembly 60 is a purge/evacuation tube 78, fitted into one side of the die body 62, enabling the purging and evacuation of the retort comprised of the die body 62 membrane cover 64 and lower cover 64'.

The die parts are fabricated from an alloy which will not interdiffuse with the alloy parts being joined; i.e., with the shell blade section 10' and the root fitting 50, both of which are typically made of titanium. An example of the alloy used for die parts is a stainless steel alloy having 22 percent chromium, 4 percent nickel and 9 percent manganese, available from Armco Steel. The use of non interdiffusion alloys for die and the parts to be bonded eliminates the need for a parting compound and the associated disadvantage attributable to the tendency of parting compounds to migrate to the joint area where diffusion is to take place and thus prevent complete diffusion.

As discussed more fully hereinabove, several design steps must be completed prior to the forming and bonding step in die assembly 60. Firstly, from the geometry of the parts to be joined and the desired homogeneous juncture shape, the force application direction must be determined. In addition, the most economically feasible fabricable shape of the parts to be joined and the flow volume of material required to flow and achieve the desired juncture must also be determined. Overfill flow material must be provided so that intimate contact can be established during the application of force without requiring near zero tolerances on the relatively complex shaped parts being joined.

Also, prior to the forming and bonding step in die assembly 60, the die ram 66 and ram base 66' must be designed and made in such a manner as to enable the application of the required loads to the area to be flowed and positive closed position stops provided to assure finished part net dimensions. In addition, the die ram 66 and ram base 66' must be shaped so as to achieve the desired finished part geometry. It is well known that, at elevated temperatures, metallic materials will plastic flow and creep flow if pressure is applied to them for a finite period of time. It is this plastic flow characteristic of metallic materials which makes possible the intimate surface contact and shaping attainable by this invented method of solid state diffusion bonding. It is preferable to use the highest elevated temperature, up to the limit of the transformation temperature of the alloy. In the case of 6AL-4V titanium, for example, the transformation temperature is approximately 1820°F, and, thus, the preferred operating temperature. However, the transformation temperature will vary from heat batch to heat batch of a production alloy;, thus, a safe operating temperature for diffusion bonding is approximately 50° to 100°F below the published transformation temperature for the alloy. For the alloys to be diffusion bonded, the plastic flow characteristics as a function of temperature, load, and rate of load application can be readily determined. Based upon these kind of data, upon the projected area of the material to be flowed and the ram travel required, the required ram load forces are determined.

A still further preparatory step done prior to the bonding and forming step, is to provide additional plastic flow material along the required edges of the face sheets 14 and 15 of the panel blank 10 as shown in FIG. 20. As discussed above, the purpose of this is to provide the necessary volume of material to plastic flow to the required geometry of the parts juncture. The selective reduction of the panel thick face sheet material can be accomplished by techniques known to the state of the art; such as machining, electrical discharge removal and chemical milling. Chemical milling is presently the most economical method.

The achievement of a solid state diffusion bond joint requires that the surfaces to be joined are clean, free of surface oxides and other foreign contaminants, organic and otherwise. The requisite state of cleanliness must be maintained throughout the joining process. Therefore, prior to loading the die assembly 60, the shell blade section 10' and the root fitting 50, typically titanium, are cleaned by acid pickling techniques known in the trade, which pickling removes the surface oxides. A suitable acid for titanium is nitric hydroflouric ($HNO_3$). The alloy steel parts of the die assembly 60 are solvent cleared to remove all organic contaminants. A typical solvent suitable for this purpose is acitone. The preferred method of maintaining the desired state of cleanliness during the heat processing of the diffusion bond is to use a hard vacuum such as, for example, $10^{-4}$ Torr minimum. The requisite vacuum is attainable by use of a die assembly 60 which is designed to form a retort, as shown, in FIGS. 8a and 8b. An alternate approach is to use a vacuum furnace press.

Assembly of die assembly 60 and the installation of shell blade section 10' and root fitting 50 therein is preferably done in a dust-free atmosphere. Contamination due to handling is reduced substantially by the use of clean white gloves. The parts, i.e., the shell blade section 10' and root fitting 50, must be positioned in their correct spatial relationship within the die assembly 60. Shimming of the die parts, such as 200 in FIG. 8a, is done as required to minimize tolerance build-up. Shell blade section 10' is tack welded to root fitting 50 at points 82 and 82', as shown in FIG. 9, to assure that the part will maintain their spatial relationship during the die loading step. Tacking is done at points 82 and 82' which typically are designed to be subsequently machined away during the removal of flashing 170. The die assembly 60 is then sealed by welding upper retort cover 64 to die body 62. In addition, the purge tube 78 is welded into position, as shown in FIG. 8a. In this configuration die assembly 60 functions as a retort die (and will hereinafter be referred to as such). The next step is to check the retort die assembly 60, with parts installed, for leaks, the objective being to verify that it can hold a vacuum of at least $10^{-4}$ Torr.

To further clean and remove the air from sealed retort die assembly 60, it is purged with an inert gas, such as argon. Purge tube 78 is coupled to a vacuum pump and to a source of the inert gas through a conventional pipe and valve assembly (not shown). By the appropriate opening and closing of the valves, the sequential evacuation of retort die assembly 60 and its back-filling with the inert gas is carried out. First the retort die assembly 60 is evacuated to a minimum vacuum level of about $10^{-4}$ Torr and then back-filled with the inert gas. The evacuation and back-filling cycle is repeated a number of times, typically at least 3 times, and then a final vacuum is achieved and maintained. By virtue of the multiple evacuation and back-filling cycles, any residual gas in the retort die assembly 60 is substantially the inert gas rather than air. The retort die assembly 60 is then heated to approximately 1000°F for a sufficient period of time, typically at least 30 minutes, to remove, by out-gassing, any remaining gases, water vapor and organic contaminants. Following the vacuum hot out-gassing step, the retort die assembly 60, while the hard vacuum of at least $10^{-4}$ Torr is maintained, is heated to approximately 50°–100°F below the alloy transformation temperature. Heating can be accomplished in an air furnace using the die retort approach. In the case of titanium alloy 6AL-4V, the temperature used is about 1725°F. In order to ensure uniform temperature distribution, the retort die assembly is allowed to soak at this temperature for a sufficient period of time, typically at least one hour. The temperature is maintained at approximately 50°–100°F below the theoretical transformation point since the process temperature must not exceed the actual transformation temperature of the particular alloy in order to maintain the original wrought properties of the materials to be joined. However, as indicated above, the highest practical temperature should be used to achieve the greatest possible degree of plastic flow.

Figure 14:
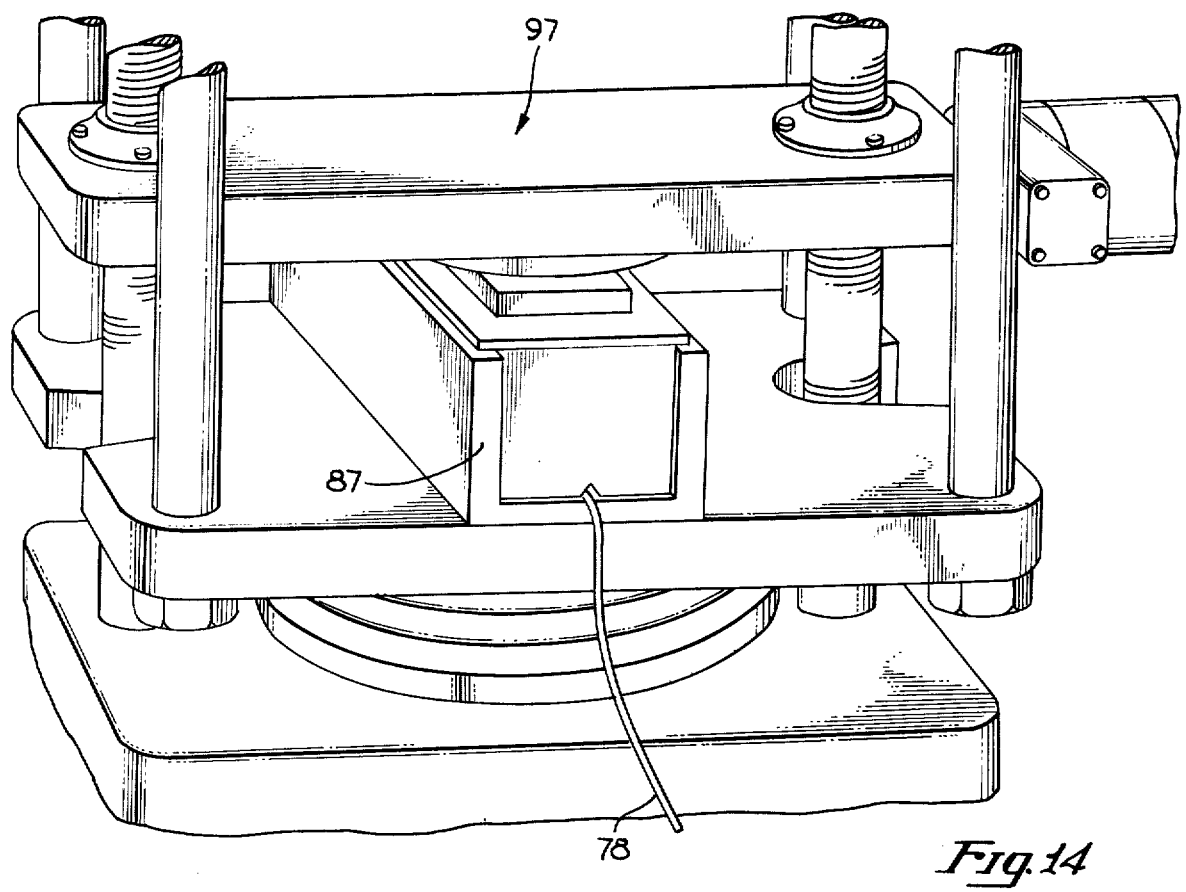
FIG. 14 is a front perspective view of an insulation box containing a retort die assembly under pressure in a hydraulic press.

At this point in the invented method the required load (pressure) is applied to the heated retort die assembly 60 at the required rate and held for the required time. There are a number of different means for applying the load as a function of the equipment available. A preferred method is to remove the retort die assembly 60 from the furnace and to place it in a heat insulation box 87. The insulation box 87 is then closed and placed in a hydraulic press 97, as shown in FIG. 14. After the required deformation is achieved, the load pressure is maintained for the predetermined time to utilize the creep characteristics of the blade material so as to enhance the finished part tolerance control. This takes advantage of creep deformation, which typically occurs in addition to complete plastic flow, to fill the die cavity.

During the load application step, the leading and trailing edges 26 and 26' of the shell blade section 10' are formed with the specified degree of solidity S. Leading and trailing edge solidity is of great importance. Solidity S, as used here, refers to the chord-wise depth of the solid portion of the leading and trailing edges, 26 and 26', formed by the juncture of the edges of face sheets 14 and 15. Solidity S allows for service damage to the edges, caused by foreign object impingement to be repaired by filing or machining the edges without getting into the hollow portion of the blade. The forming of the leading edge 26 is described with reference to FIGS. 16–19. The description is equally applicable to trailing edge 26'. FIG. 16 shows the respective positions of face sheets 14 and 15 interfacing along what will become the leading edge 26, prior to the application of the load. Following the diffusion bonding step, a homogeneous juncture is achieved, as shown in FIG. 17. An increased volume of local flow material 14' and 15' along the edges of the face sheets 14 and 15, respectively, preferred for greater solidity S in the junction area. The addition of such flow material 14' and 15' is shown in FIG. 18. As a result of the plastic flow of added material 14' and 15', a solid state diffusion bonded leading edge 26 is achieved with substantially greater solidity S as shown in FIG. 19. Subsequently, leading and trailing edges 26 and 26' are machined to remove the flashing and provide the required radius $r$. Typically, the wedge angle W and radius $r$ are very small; i.e., usually the wedge angle W is from 6°–10° while the radius $r$ is from 0.005–0.020 inches. The zone of solidity S achieved by the invented method is sufficiently wide to encompass the required wedge angle solid section, as shown in FIG. 19. Machining is typically accomplished by a mill cutter. The method disclosed herein allows substantially greater design freedom with respect to the solidity S of leading and trailing edges 26 and 26'. For example, in the case of aerodynamic blades, leading and trailing edges 26 and 26', having a solidity depth of from 0.125 to 0.250 inches, can be readily achieved as compared with a depth of 0.060 inches achieved by the methods of the prior art.

Figure 22:
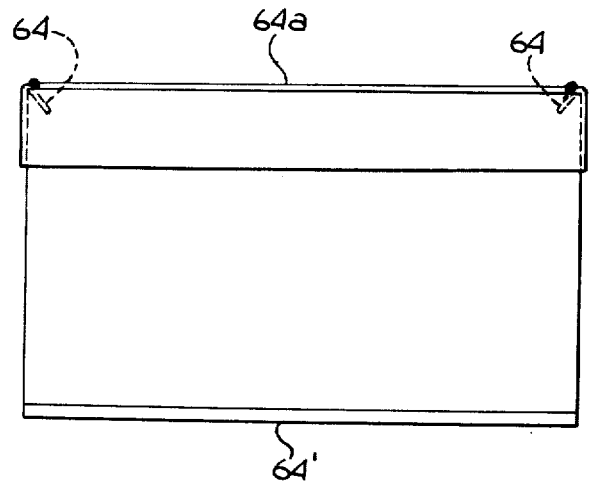
FIG. 22 is a side elevation view of a reusable retort die assembly showing the manner in which a new upper retort membrane cover is affixed after the original cover is cut away.

Following the forming and bonding step, the retort die assembly 60 is removed from insulation box 87 and allowed to cool to about the ambient air temperature. After cooling, the upper membrane retort cover 64 is cut and removed. This enables the removal of ram die 66 and aerodynamic blade 90 comprised of the now joined shell blade section 10' and the root fitting 50. Aerodynamic blade 90 is shown in FIG. 21, after the removal of surplus flashing and subsequent machining. The retort die assembly 60 is reusable with only the addition of new upper membrane retort cover 64a, as shown in FIG. 22. The new upper retort cover 64a is typically welded to the remnant of the original upper retort cover 64 left after being cut for the removal of the blade.

The finished blade 90, shown in FIG. 21, has a thin airfoil shape in cross-section. It can have a variable thickness and variable chord and camber along its longitudinal direction 92 and a variable angle of twist can be added by creep twisting. The leading and trailing edges 26 and 26' have very small wedge angles, i.e., angles which approach the knife edge typical in aerodynamic applications. The result is a thin skin shell blade 90 having high strength and stiffness to weight ratios as required for maximum efficiency.

Although this invention has been disclosed and described with reference to a particular embodiment and to a preferred method, the principles involved are susceptible of other applications which will be apparent to persons skilled in the art. Also, it should be understood that while specific reference has been made to titanium base alloys as the preferred part material, other wrought alloys can be used such as aluminum base alloys, stainless steel alloys, nickel base alloys, cobalt base alloys and columbium base alloys. It is understood that various changes in the form, detail and application of the present invention can be made by those skilled in the art without departing from the spirit and scope of the invention. This invention, therefore, is not intended to be limited to the particular embodiment or preferred method herein disclosed.

I claim:
1. A method for fabricating a thin skin, internally stiffened, aerodynamic shaped shell structure having homogeneous leading and trailing edges with parent material properties comprising the steps of:
   a. fabricating a panel blank comprised of metallic stiffening material disposed between and joined to first and second planar metallic face sheets, said face sheets each having a thickness dimension substantially less than its surface dimensions, the edges of each of said face sheets having in their longitudinal direction a sufficient volume of flow material thereon to achieve the required solidity of said leading and trailing edges, said volume of flow material being about 5–10 percent oversized, and said stiffening material giving to said structure the required strength and stiffness to weight ratios;
   b. forming said panel blank into a basic aerodynamic shape by imparting thereto aerodynamic contours;
   c. providing a die assembly including a die ram, said die assembly being installed within means for applying pressure and said die ram being configured to achieve the desired contours for said aerodynamic structure;
   d. disposing said panel blank in said die assembly; and
   e. applying a forming and joining force to said panel blank by the action of said die ram in said die assembly as pressure is applied to said die assembly in an inert atmosphere at a temperature below the transformation temperature of the metal of said panel blank for a sufficient duration to form said aerodynamic structure and to acheive solid state diffusion bonding of said edges of said face sheets into said leading and trailing edges, said forming and joining force being determined from the volumes of said flow material and the plastic flow and creep characteristics of said metal whereby said oversized flow material on said face sheet edges allows said edges to fit within said die assembly with a positive fill, thereby substantially eliminating the necessity of very close tolerances.

2. The method of claim 1 wherein said panel blank is initially fabricated by partially diffusion bonding said stiffening material to said face sheets so as to maintain them in intimate contact, complete diffusion bonding thereof taking place during said application of said forming and joining force thereto.

3. The method of claim 1 wherein said panel blank is fabricated with a constant spacing between said face sheets.

4. The method of claim 1 wherein said stiffening material is crushable.

5. The method of claim 1 wherein said volume of flow material along said longitudinal edges of said face sheets is achieved by fabricating said panel blank with face sheets having a greater thickness than required and by reducing said thickness in at least one step in the transverse direction away from said edges.

6. The method of claim 5 wherein the reduction of the thickness of said face sheets is by chemical milling.

7. The method of claim 5 wherein the reduction of the thickness of said face sheets is by electrical discharge machining.

8. The method of claim 1 wherein said panel blank is formed into a basic aerodynamic shape by crush forming within a crush die set.

9. The method of claim 1 wherein said inert atmosphere is a vacuum of at least approximately $10^{-4}$ Torr.

10. The method of claim 1 wherein said die ram and assembly are configured so that the pressure produced by said forming and joining force is approximately 100 times greater along said edges being joined than on the surfaces of said face sheets being formed.

11. The method of claim 1 wherein said die assembly is enclosed in metallic members which form a retort envelope, said retort envelope being configured to maintain said inert atmosphere.

12. The method of claim 11 wherein said inert atmosphere is an inert gas.

13. The method of claim 11 wherein said inert atmosphere is a vacuum of at least approximately $10^{-4}$ Torr.

14. The method of claim 11 wherein, prior to the application of said forming and joining force, said retort envelope is purged with an inert gas and evacuated, heated to approximately 1000°F for a time sufficient to remove remaining contaminants by vacuum hot outgassing, finally evacuated to a vacuum of at least approximately $10^{-4}$ Torr, and then soaked at said temperature for a time sufficient to achieve uniform temperature.

15. The method of claim 1 wherein said die assembly is placed within an inert atmosphere furnace press, said furnace press being configured to maintain said inert atmosphere.

16. The method of claim 15 wherein said inert atmosphere is an inert gas.

17. The method of claim 15 wherein said inert atmosphere is a vacuum of at least approximately $10^{-4}$ Torr.

18. The method of claim 1 including the additional step of cleaning the to-be-joined surfaces of said panel blank prior to the application of said forming and joining force.

19. The method of claim 1 including the additional steps of cooling said structure and removing flashing from said leading and trailing edges thereof, after the application of said forming and joining force, said flashing being due to excess flow material.

20. The method of claim 1 wherein said forming and joining force is applied at a temperature approximately 50°-100°F below said transformation temperature.

21. A method for fabricating a thin skin, internally stiffened, aerodynamic shaped shell structure having leading and trailing edges and having joined thereto at least one fitting, said leading and trailing edges and the juncture with said fitting each having homogeneous joints with parent material properties, comprising the steps of:

a. fabricating a panel blank comprised of metallic stiffening material disposed between and joined to first and second planar metallic face sheets, said face sheets each having a thickness dimension substantially less than its surface dimensions, the edges of each of said face sheets having in their longitudinal direction a sufficient volume of flow material thereon to achieve the required solidity of said leading and trailing edges, said volume of flow material being about 5-10% oversized, and said stiffening material giving to said structure the required strength and stiffness to weight ratios;

b. fabricating a fitting blank of the same metal alloy group as said panel blank, said fitting blank being adapted to engage said panel blank along the corresponding surfaces to be joined, said fitting blank having a sufficient volume of flow material in the vicinity of said surfaces to be joined to achieve said homogeneous joint and required blending geometry, said volume of flow material of said surfaces being about 5-10 percent oversized;

c. forming said panel blank into a basic aerodynamic shape by imparting thereto aerodynamic contours;

d. position attaching said fitting blank to said panel blank;

e. providing a die assembly including a die ram, said die assembly being installed within means for applying pressure and said die ram being configured to achieve the desired contours of said aerodynamic structure;

f. disposing said panel blank and said fitting blank in said die assembly, and g. applying a forming and joining force to said panel blank and said fitting blank by the action of said die ram in said die assembly as pressure is applied to said die assembly in an inert atmosphere at a temperature below the transformation temperature of said metal for a sufficient duration to form said aerodynamic structure, to achieve solid state diffusion bonding of said edges of said face sheets into said leading and trailing edges, and to achieve solid state diffusion bonding between said forming and joining force being determined from the volumes of said flow material and the plastic flow and creep characteristics of said metal whereby said oversized flow material on said face sheet edges allows said edges and said fitting blank to fit within said die assembly with a positive fill and the engagement of said fitting blank and said panel blank is made with a positive fill, thereby eliminating the necessity of very close tolerances.

22. The method of claim 21 wherein said panel blank is initially fabricated by partially diffusion bonding said stiffening material to said face sheets so as to maintain them in intimate contact, complete diffusion bonding thereof taking place during said application of said forming and joining force thereto.

23. The method of claim 21 wherein said panel blank is fabricated with a constant spacing between said face sheets.

24. The method of claim 21 wherein said stiffening material is crushable.

25. The method of claim 21 wherein said volume of flow material along said longitudinal edges of said face sheets is achieved by fabricating said panel blank with face sheets having a greater thickness than required and by reducing said thickness in at least one step in the transverse direction away from said edges.

26. The method of claim 25 wherein the reduction of the thickness of said face sheets is by chemical milling.

27. The method of claim 25 wherein the reduction of the thickness of said face sheets is by electrical discharge milling.

28. The method of claim 21 wherein said panel blank is formed into a basic aerodynamic shape by crush forming within a crush die set.

29. The method of claim 21 wherein said inert atmosphere is a vacuum of at least approximately $10^{-4}$ Torr.

30. The method of claim 21 wherein said die ram and assembly are configured so that the pressure produced by said forming and joining force is approximately 100 times greater on the surfaces being joined than on the surfaces of said face sheets being formed.

31. The method of claim 21 wherein said die assembly is enclosed in metallic members which form a retort envelope, said retort envelope being configured to maintain said inert atmosphere.

32. The method of claim 31 wherein said inert atmosphere is an inert gas.

33. The method of claim 31 wherein said inert atmosphere is a vacuum of at least approximately $10^{-4}$ Torr.

34. The method of claim 31 wherein, prior to the application of said forming and joining force, said retort envelope is purged with an inert gas and evacuated, heated to approximately 1000°F for a time sufficient to remove remaining contaminants by vacuum out-gassing, finally evacuated to a vacuum of at least approximately $10^{-4}$ Torr, and then soaked at said temperature for at time sufficient to achieve uniform temperature.

35. The method of claim 21 wherein said die assembly is placed within an inert atmosphere furnace press, said furnace press being configured to maintain said inert atmosphere.

36. The method of claim 35 wherein said inert atmosphere is an inert gas.

37. The method of claim 35 wherein said inert atmosphere is a vacuum of at least approximately $10^{-4}$ Torr.

38. The method of claim 21 including the additional step of cleaning the to-be-joined surfaces of said panel blank and said fitting blank prior to the application of said forming and joining force.

39. The method of claim 21 including, after the application of said forming and joining force, the steps of cooling said structure, removing flashing and machining said fitting blank, said flashing being due to excess flow material.

40. A method for fabricating a thin skin, internally stiffened, aerodynamic shaped shell structure, having homogeneous leading and trailing edges with parent material properties comprising the steps of:

a. fabricating first and second planar, metallic face sheets, each having a thickness dimension substantially less than its planar dimension, the thickness thereof being initially greater than that required;

b. reducing the thickness of said face sheets in at least one step in the transverse direction away from the longitudinal edges of said face sheets, thereby leaving on said edges of said face sheets a sufficient volume of flow material to achieve the required solidity of said leading and trailing edges;

c. fabricating a panel blank comprised of crushable metallic stiffening material disposed between said face sheets equidistantly spaced, said stiffening material being partially diffusion bonded to said face sheets so as to maintain them in intimate contact, complete diffusion bonding thereof taking place subsequently during the application of a forming and joining force thereto, said stiffening material giving to said structure the required strengh and stiffness to weight ratios;

d. rough trimming said panel blank and providing reference control means;

e. crush forming said panel blank within a crush die set, thereby imparting to it the basic aerodynamic contours and causing said longitudinal edges of said face sheets to be in contacting engagement along their entire length;

f. cleaning the to-be-joined surfaces of said panel blank;

g. installing said panel blank into a die assembly comprised of a restraining die body, a die ram, a ram base, load distribution plates and means for holding said panel blank securely in position, the shape of said die ram being configured to achieve the desired contours of said aerodynamic structure, said parts of said die assembly being first cleaned, said die assembly in turn being enclosed in metallic members to form a retort envelope;

h. purging said die assembly with an inert gas and evacuating the same a sufficient number of times to remove air enclosed during assembly;

i. heating said die assembly and said panel blank to approximately 1000°F for sufficient time to remove remaining contaminants by vacuum hot out-gassing;

j. evacuating said die assembly to a vacuum of at least approximately $10^{-4}$ Torr.

k. soaking said die assembly and said panel blank at a temperature approximately 50°–100°F below the transformation temperature of the metal of said panel blank for sufficient time to achieve a uniform temperature distribution;

l. placing said die assembly into an insulation box to retain the heat, said insulation box in turn being placed into an hydraulic press;

m. applying pressure to said die ram, through said insulation box, for a sufficient duration to form said aerodynamic structure, to cause said flow material on said edges of said face sheets to plastic flow to the required shape while achieving intimate surface contact at the joint and to achieve thereby solid state diffusion bonding of said edges into said leading and trailing edges, said pressure causing said die ram to apply a forming and joining force upon said panel blank, said forming and joining force and its duration being determined from the volumes of said flow material, the distance of said flow, the travel of said die ram, the plastic flow and creep deformation characteristics of said metal and the force required to achieve final sizing and contour forming of said panel blank;

n. cooling said die assembly and removing therefrom said aerodynamic structure;

o. removing flashing from said leading and trailing edges; and p. removing said reference control means and final machining any unnecessary remaining material.

41. The method of claim 40 including additional steps whereby at least one fitting is solid state diffusion bonded to said panel blank, the joint thereinbetween being homogeneous and having parent material properties, said additional steps being comprised of:

a. fabricating a fitting blank of the same metal alloy group as the panel blank, said fitting blank being adapted to engage said panel blank along the corresponding surfaces to be joined, said fitting blank having a sufficient volume of flow material in the vicinity of said surfaces to be joined to achieve said homogeneous joint and required blending geometry;

b. position attaching said fitting blank to said panel blank following the crush forming of said panel blank; and c. installing said fitting blank into said die assembly together with said panel blank.

42. The method of claim 40 wherein said metal is titanium 6AL-4V, said crush forming takes place at a temperature in the range of 900° to 1200°F, and said transformation temperature is about 1820°F.

43. The method of claim 40 wherein said crush die set achieves an underdeveloped aerodynamic shape.

* * * * *